United States Patent [19]
Belvederi et al.

[11] Patent Number: 5,682,810
[45] Date of Patent: Nov. 4, 1997

[54] BRAZIER FOR COOKING FOODSTUFFS

[76] Inventors: Bruno Belvederi, Via Giovanni XXIII, 12, I-40050 Monte San Pietro (Bologna); Carlo Alberto Goldoni, Via Francesco del Cossa, 10, I-40133, Bologna, both of Italy

[21] Appl. No.: 654,275

[22] Filed: May 28, 1996

[30] Foreign Application Priority Data

May 30, 1995 [IT] Italy ............... BO95A0271

[51] Int. Cl.⁶ .................................. A47J 37/06
[52] U.S. Cl. .................... 99/395; 99/397; 99/427
[58] Field of Search ................ 99/393, 395, 397, 99/427

[56] References Cited

U.S. PATENT DOCUMENTS

| | | | |
|---|---|---|---|
| 2,576,028 | 11/1951 | Mitchell | 99/397 |
| 3,802,331 | 4/1974 | Zickefoose | 99/427 |
| 4,492,152 | 1/1985 | DeSantis | 99/397 |

FOREIGN PATENT DOCUMENTS

| | | |
|---|---|---|
| 1 454 157 | 8/1969 | Germany. |
| 24 25 860 | 12/1975 | Germany. |
| 662 496 | 10/1987 | Switzerland. |

Primary Examiner—David Scherbel
Assistant Examiner—Reginald L. Alexander
Attorney, Agent, or Firm—Cushman Darby & Cushman Intellectual Property Group of Pillsbury Madison & Sutro LLP

[57] ABSTRACT

A brazier for cooking foodstuffs includes a support for the foodstuffs that is mounted on a swivelling frame in such a way as to be able to turn around its own axis, in front of a source of heat, when operated by a drive mechanism. The swivelling frame turns around an axis that is placed at a certain distance from, and parallel to, the axis of the support, and the support is attached to a cross bar whose end parts move alternately along a fixed track when the support is turned around its axis. This causes the frame to swivel around its own axis.

9 Claims, 3 Drawing Sheets

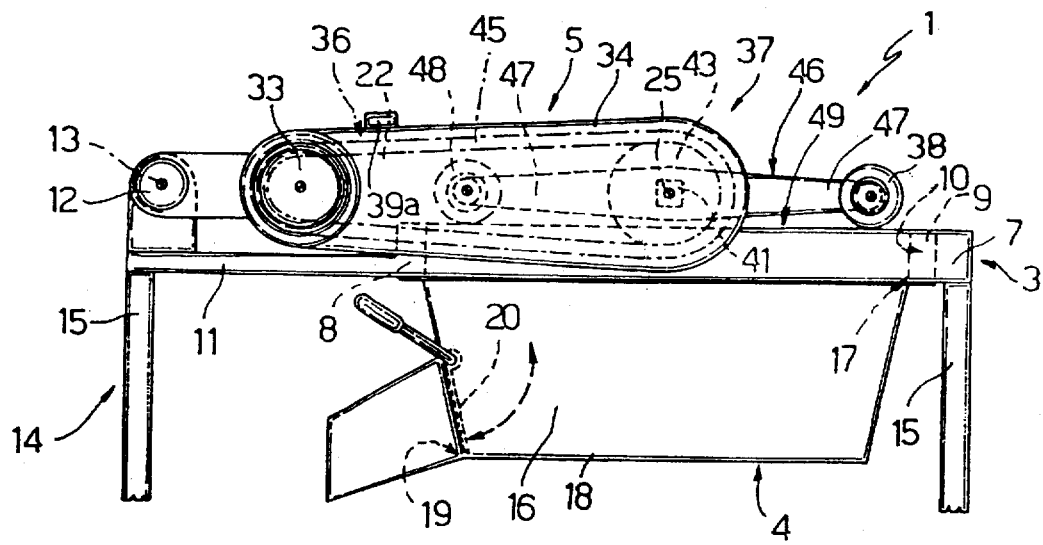
Fig. 1
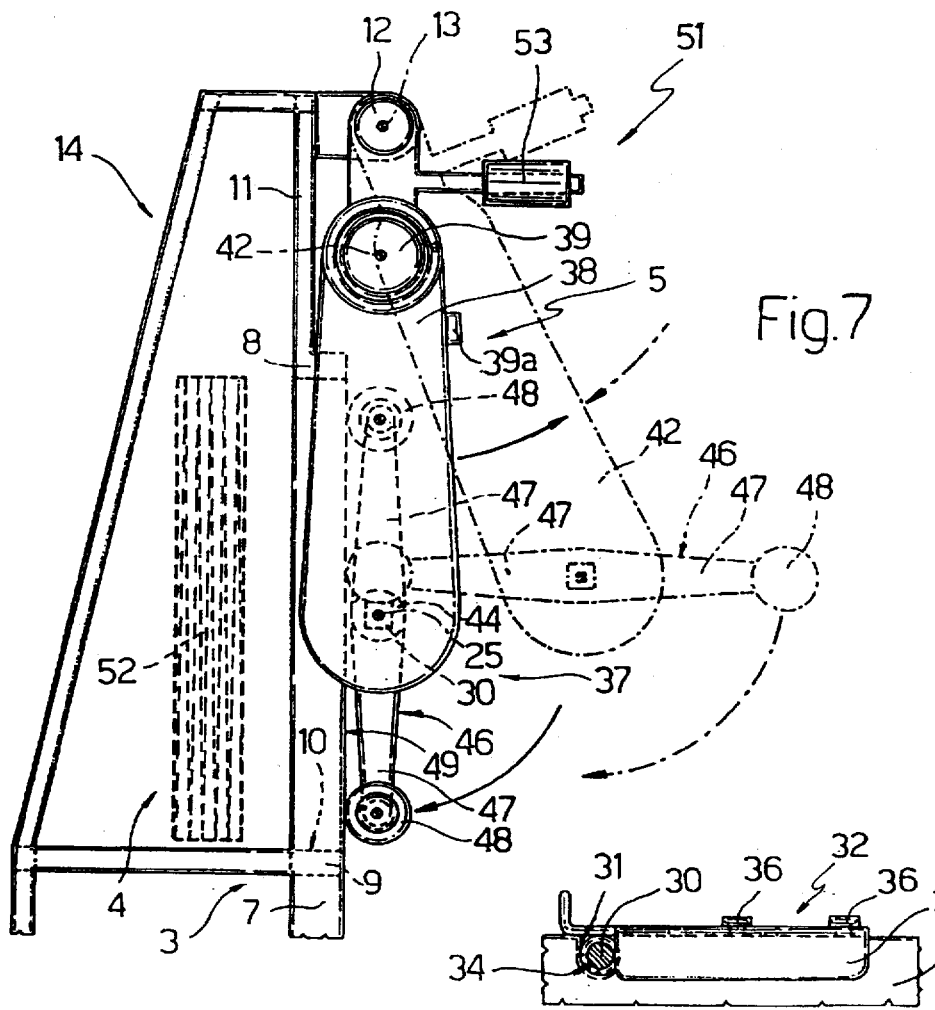
Fig. 7
Fig. 5

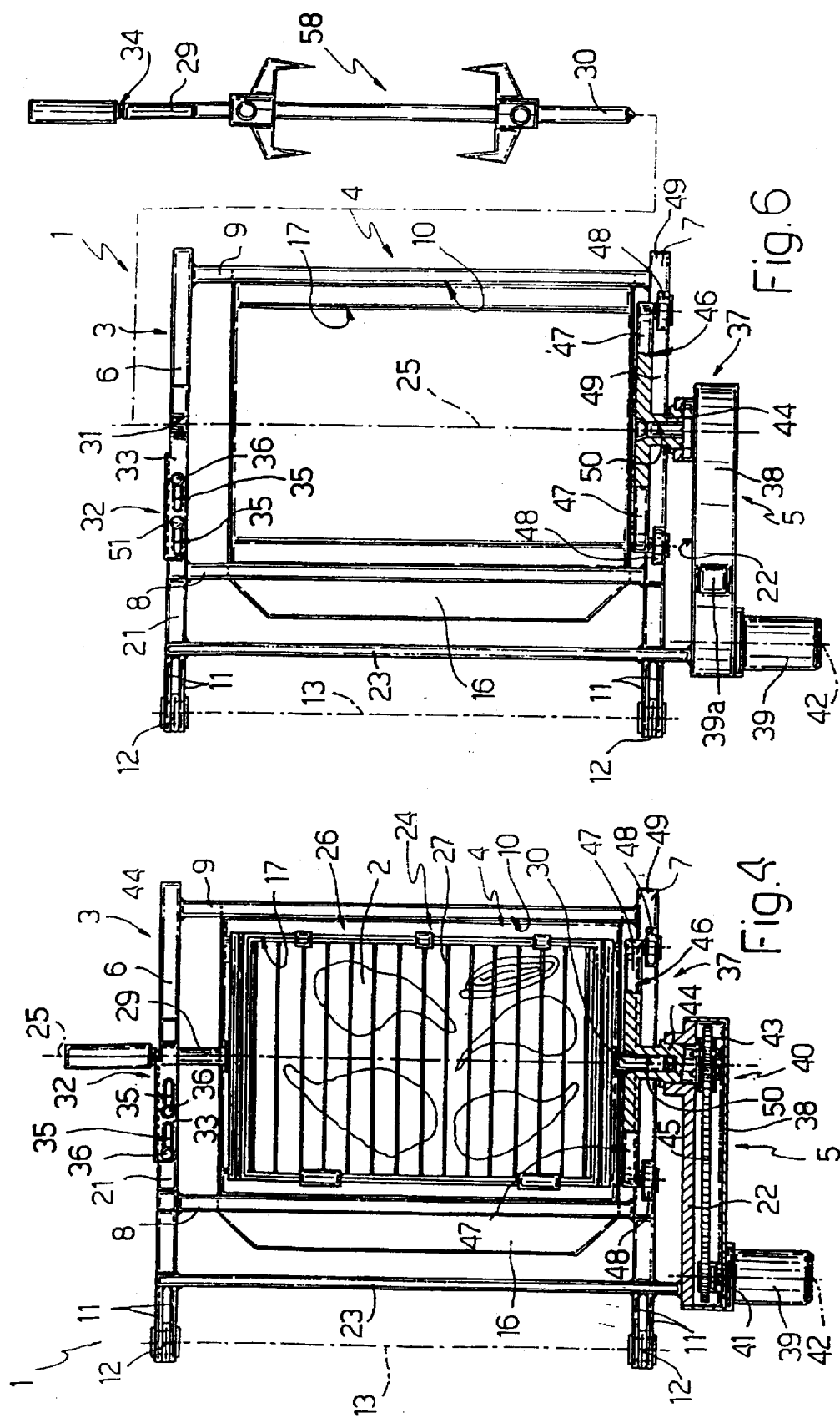

BRAZIER FOR COOKING FOODSTUFFS

BACKGROUND OF THE INVENTION

This invention concerns a brazier for cooking foodstuffs. More precisely, the invention regards a brazier which includes a fixed frame, a source of heat placed in a fixed position in relation to the frame, and a support plate mounted on the frame in such a way as to be near the source of heat. The support plate normally includes two grills, which face each other, that are used to hold the food and that can be turned over on the fixed frame so as to properly expose both sides of the food to the source of heat.

SUMMARY OF THE INVENTION

The aim of this invention is to provide a brazier such as that described above, which is designed in such a way as to avoid any intervention on the part of the user during cooking, and which renders it possible to perform a cooking cycle in a programmable and fully automatic way.

A further scope of this invention is to provide a brazier which, during the automatic cooking cycle, can keep the food at a distance from the source of heat which should be greater than a predetermined distance, in particular when the support plate is being turned over.

Another object of this invention is to provide a brazier which can be stopped, at the end of the automatic cooking cycle, in such a position as to ensure the food is exposed as little as possible to the source of heat.

This invention specifically aims at developing a brazier for cooking foodstuffs which includes a fixed support frame, a source of heat placed in a fixed position in relation to the frame, a support for the food, and a drive mechanism used to turn the support around a first axis in relation to the fixed frame and in front of the source of heat, wherein there is further provided a mobile frame attached to the fixed frame so as to rotate in relation to the fixed frame around a second axis parallel to the first axis and positioned at a determined distance in relation to the first axis; the first axis being connected to the mobile frame; track means positioned transversally to the two axes being supported by the fixed frame; and slide means being carried by the support to slide along the track means while the support rotates around the first axis through the action of the drive mechanism.

BRIEF DESCRIPTION OF THE DRAWINGS

The present invention will be now described by referring to the relevant drawings which give general examples, where:

FIG. 1 illustrates a preferred form of the brazier based on the present invention;

FIG. 4 is a plan view of the brazier illustrated in FIG. 1 where cross sections of some parts are given and other parts have been removed for clarity;

FIG. 5 gives an enlarged view of a part illustrated in FIG. 4 and shows cross sections of some parts;

FIG. 6 illustrates another preferred form of the brazier based on the present invention; and FIG. 7 illustrates a third preferred form of the brazier based on this invention.

DETAILED DESCRIPTION

Figure 2:
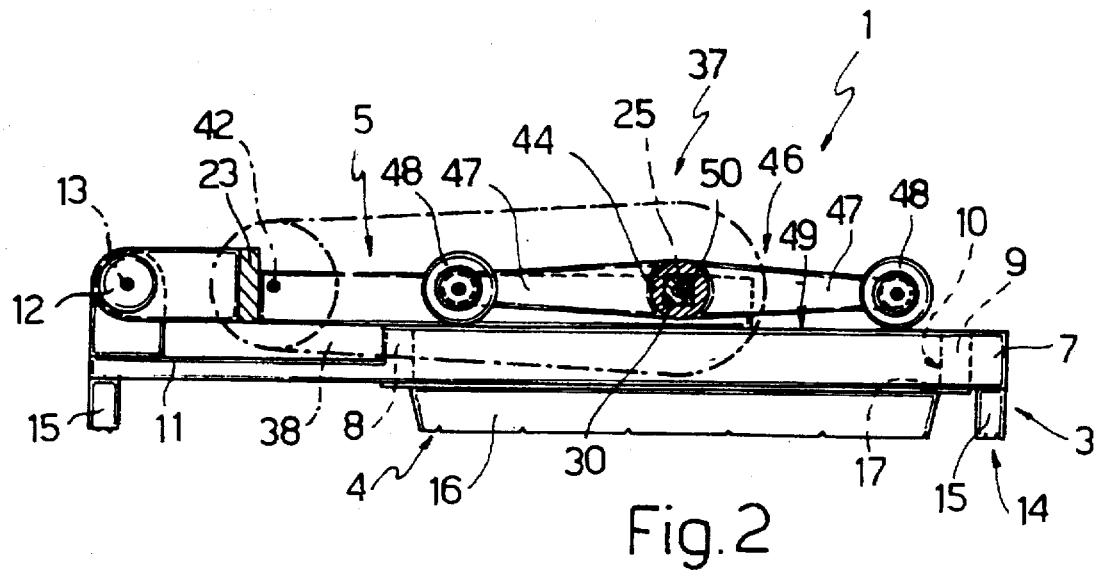
FIGS. 2 and 3 show the brazier illustrated in FIG. 1 set to two different operating positions.

When referring to FIGS. 1 and 2, 1 indicates an entire brazier used for cooking foodstuffs 2 (FIG. 4). The brazier 1 includes a fixed frame 3, a source of heat 4 located on the fixed frame 3, used for warming up and cooking the food 2, and a mobile frame 5 which can swivel on the frame 3.

In particular, as can be better seen in FIG. 4, the frame 3 includes two side walls 6 and 7 parallel to each other and two parallel cross bars 8 and 9 which, along with the side walls 6 and 7, create a substantially rectangular frame lying on a substantially horizontal plane. The end portions 11 of the side walls 6 and 7, which extend beyond the frame 10 at the point where the cross bar 8 lies, carry respective hinges 12, which are aligned with each other along an axis 13, which is parallel with and close to the cross bar 8, so as to join the frame 5 to the frame 3. The frame 3 includes a base structure 14 that comes with four substantially vertical posts 15 which extend longitudinally down beyond the opposite ends of the side walls 6 and 7.

As illustrated in FIGS. 1 and 4, the source of heat 4 includes a bowl 16 mounted on the frame 3, whose upper open end 17 is under and facing the frame 10. The bowl 16 serves to contain the fuel (known and not described) used to warm up and cook the food 2. The bowl 16 has an opening 19 in the bottom plate 18 so that the combusted residual products can be discharged. A door 20 is hinged to the upper side of the opening 19 so as to normally keep the opening 19 closed.

The frame 5 includes two side members 21 and 22. The ends of the side members 21 and 22 are attached to the hinges 12 on the side walls 6 and 7. Moreover, a bar 23, placed in an intermediate position between the hinges 12 and the cross bar 8, provides a link between the ends of the side members 21 and 22.

The brazier 1 also includes a support 24 for the food 2. The support 24 is attached to the frame 5 and can turn around an axis 25 parallel to the axis 13 and disposed on the opposite side of the axis 13 with respect to the cross bar 23.

The support 24 includes, as illustrated in FIG. 4, a grill 26 which comes in two virtually rectangular parts 27 which face each other. On the other hand, according to the variant shown in FIG. 6, the support 24 includes a spit 28 instead of a grill 26.

The support 24 comes with two pins 29 and 30 at both ends of the grill 26 or of the spit 28. These pins 29 and 30 are coaxial with each other as well as with axis 25 and the pin 30 has a square section while the pin 29 has a round section and turns axially into a seat 31 (FIG. 5). The upper part of the seat 31 is open and is coaxial with axis 25 at the end of the member 21 which is part of the frame 5. As can be better seen in FIG. 5, the pin 29 can be removed axially from the seat 31 by releasing a lock 32 which, apart from the seat 31, also includes an L-shaped plate 33. This plate 33 engages with a groove 34, cut around the circumference of the pin 29, and comes with two slots 35 in which respective pins 36, integral with the member 21, slide, thereby allowing the plate 33 to open (as illustrated in FIG. 6) or close the seat 31 (FIG. 5).

Figure 3:
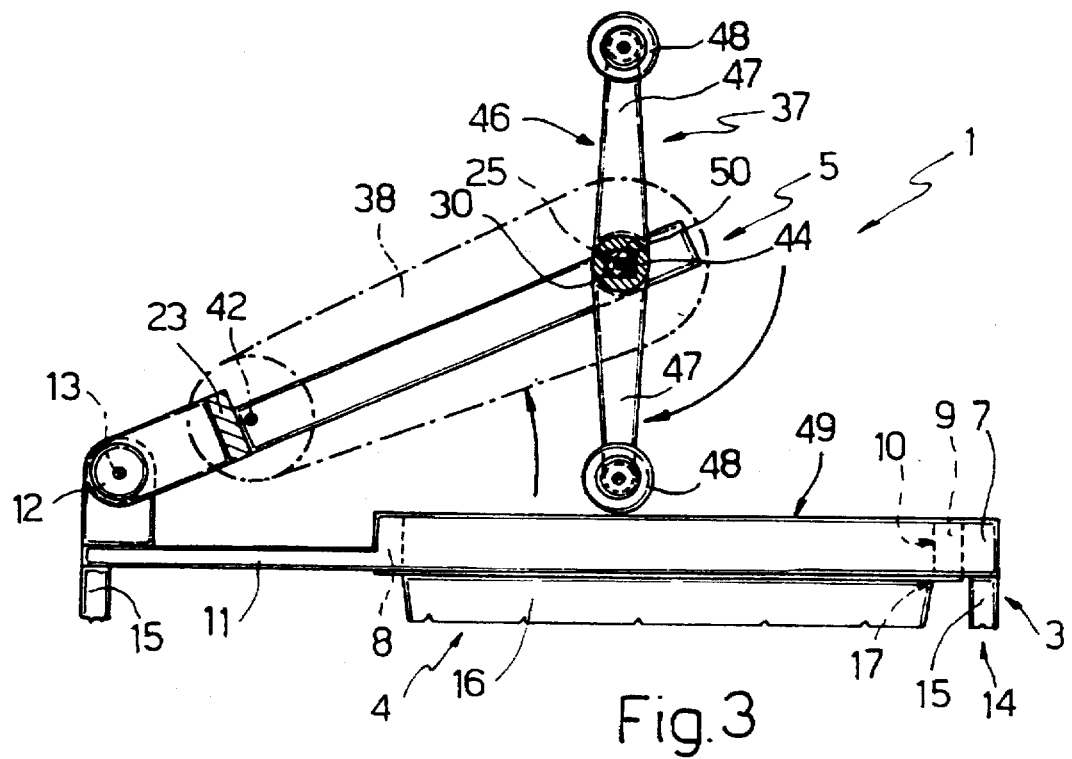

The pin 30 can be disengaged from a drive 37, which is attached to the pin 30 to compel the element 24 to turn around the axis 25. Meanwhile, the frame 5 rotates around the axis 13. Note that the drive 37 causes the frame 5 to swing about the axis 13 between the cooking area (as illustrated in FIG. 2) where the members 21 and 22 of the frame 5 are parallel to each other and face the respective walls 6 and 7 of the frame 3, and the support 24 is adjacent to the frame 10 and faces the opening 17 in the bowl 16, and an intermediate position, as shown in FIG. 3, where the members 21 and 22 of the frame 5 form a determined acute angle together with the walls 6 and 7 of the frame 3.

As illustrated in FIG. 4, the drive unit 37 rests on a box-type section 38 which is to be found at the end of the member 22, and includes a motor 39, provided with a timer 39a and located in the box-type section 38 in a position substantially coaxial with the cross bar 23, a drive chain 40 located within the box-type section 38 and provided with a sprocket 41, which is fitted to the output shaft of the motor 39 and rotates around its own axis 42 parallel with axes 13 and 25, a sprocket 43, which is integral with a sleeve 44 coaxial with the axis 25 and swivels on the box-type section 38, and a chain 45 meshing with the sprockets 41 and 43 and running within the box-type section 38.

The sleeve 44 extends on the outside of the box-type section 38 towards the member 21, and an intermediate part of a cross bar 46 is firmly secured to the sleeve 44 at the end opposite to the sprocket 43. The cross bar 46 consists of two parts 47 which point away from the sleeve 44 in diametrically opposite directions with respect to axis 25. At each end of the cross bar 46, there is a roller 48, which revolves around its axis and is parallel with the axes 13 and 25. The rollers 48 run on a track 49 which is formed by the upper side surface of the wall 7 of the frame 3. The sleeve 44, in correspondence to an end connected to the cross bar 46, has a square opening 50 which can slide axially, and in an angularly fixed way, with respect to the pin 30.

As a variant (which is not illustrated) the cross bar 46 may be attached to the pin 30 of the support 24 instead of the sleeve 44. As described above it is clear that when the motor 39 is brought into operation the support 24 and the cross bar 46 will start rotating around the axis 25, the roller 48 placed downstream with respect to the direction of rotation of the cross bar 46 itself around axis 25 runs in the track 49, and the other roller 48 will then move away from the track 49. Therefore, the rotary motion of the support 24 around the axis 25, through the action of the motor 39, causes the frame 5 to swing from its operating position to an intermediate one. More specifically, a 180° rotation of the support 24 corresponds to a movement of the frame 5 from its operating position to an intermediate one and a return of the frame 5 to its operating position.

As a result, during cooking, the support 24 is kept at a distance which never exceeds that travelled by the support 24 itself while the frame 5 is in its operating position. If the motor 39 is timer-operated, cooking can be programmed and carried out automatically and the support 24 can be stopped crosswise, when cooking has been completed, in relation to the frame 10, i.e. in a position in which the food 2 is exposed to the source of heat as little as possible.

The variant illustrated in FIG. 7 relates to a brazier 51 which is similar to the brazier 1. The first difference is that the base 14 of the brazier 51 is constructed in such a way as to have the frame 10 in a vertical position. The second difference is that the source of heat 4 includes a radiant heating element, preferably in the form of a plate or of an electrical coil, which is placed at the opposite end of the support 24 in relation to the frame 10. In this case, in order to ensure that the rollers 31 and the track 49 are kept in contact during cooking, the frame 5 is provided with counterweights 53 located on each member 21, 22 near the cross bar 23. These counterweights 53 extend beyond the respective members 21 and 22 away from the frame 5.

We claim:

1. A brazier for cooking foodstuffs, comprising:
   a fixed support frame;
   a source of heat placed in a fixed position in relation to said frame,
   a support for the foodstuffs to be cooked;
   a drive mechanism arranged to turn said support around a first axis in relation to said fixed frame, in front of the source of heat;
   a mobile frame attached to said fixed frame so as to rotate in relation to said fixed frame around a second axis which is parallel to said first axis and positioned at a determined distance from said first axis;
   a hinge providing said first axis and connected to said mobile frame;
   track means positioned transversally to said first and second axes and supported by said fixed frame;
   slide means carried by said support to slide along said track means while said support rotates around said first axis through action of said drive mechanism;
   said track means including at least one track along which said slide means can move;
   said fixed frame comprising at least one side wall which is positioned transversally in relation to said first and second axes; and
   said track being delimited by an end surface of said side wall.

2. The brazier according to claim 1, wherein:
   said slide means include two support means positioned by bands oppositely located with respect to said second axis and movable along with said support around said second axis;
   said two support means being movable alternately along said track in a same direction while said support is turned around said second axis, so as to convert a 180° rotary motion of said support around said second axis into a back and forth swinging movement of said mobile frame around said first axis, between a cooking operation position, in which said mobile frame substantially faces said fixed frame, and an intermediate position in which said mobile frame is set at an acute angle to said fixed frame.

3. The brazier according to claim 2, wherein:
   said two support means each include a roller which rotates around a third axis which is parallel to said first and second axes.

4. The brazier according to claim 3, further including:
   a cross bar that extends transversely with respect to said second axis;
   each said roller being supported by respective opposite ends of said cross bar.

5. The brazier according to claim 3, wherein:
   said fixed frame includes a structure which comprises two said side walls, both placed transversally in relation to said second axis;
   said track being disposed on one of said side walls and said structure surrounding said source of heat.

6. The brazier according to claim 5, wherein:
   said track is positioned horizontally.

7. The brazier according to claim 5, wherein:
   said track is positioned vertically;
   said mobile frame including counterweights which balance said mobile frame about said first axis;
   said counterweights extending from said mobile frame in an opposite direction to said fixed frame so as to always keep said slide means in contact with said track means.

8. The brazier according to claim 1, further including:
   lock means that axially join said support to said mobile frame so that said support and said mobile frame can be set at any angle to one another without interference.

9. The brazier according to claim 1, wherein said drive mechanism includes:
   a motor, placed on said mobile frame near said first axis and comprising an output shaft revolving around a third axis that is parallel to said first and second axes; and
   a drive which extends between said third and second axes.

* * * * *